(12) United States Patent
Brown et al.

(10) Patent No.: US 7,450,493 B1
(45) Date of Patent: *Nov. 11, 2008

(54) SYSTEM AND METHOD OF FORWARDING K-BYTES BETWEEN OPTICAL CARDS IN A COMMUNICATIONS SYSTEM

(75) Inventors: Christopher Brown, Ottawa (CA); Doug Wong, Gloucester (CA); John Paul McGrotty, Newtownabbey (GB); Armin Lackermeier, Ballymena (GB); Declan McCartan, Belfast (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 907 days.

This patent is subject to a terminal disclaimer.

(21) Appl. No.: 10/678,812

(22) Filed: Oct. 3, 2003

(51) Int. Cl.
*H04L 12/26* (2006.01)
*H04L 12/28* (2006.01)
*H04J 3/12* (2006.01)

(52) U.S. Cl. .................. 370/216; 370/222; 370/228; 370/524

(58) Field of Classification Search ............ 370/216, 370/222–224, 228, 524, 385, 227, 395.51, 370/466, 467, 496, 535, 536, 403, 404, 400–401
See application file for complete search history.

(56) References Cited

U.S. PATENT DOCUMENTS

| | | | |
|---|---|---|---|
| 6,118,797 A | 9/2000 | O'Shea | |
| 6,654,341 B1 | 11/2003 | Chi | |
| 6,683,869 B1 * | 1/2004 | Pierson, Jr. | 370/352 |
| 6,823,137 B2 * | 11/2004 | Fujita | 398/2 |
| 6,975,587 B1 * | 12/2005 | Adamski et al. | 370/217 |
| 7,012,917 B2 * | 3/2006 | Brolin et al. | 370/352 |
| 7,054,324 B1 * | 5/2006 | Ben-Zur et al. | 370/404 |
| 7,170,851 B1 * | 1/2007 | Chen et al. | 370/222 |
| 7,170,852 B1 | 1/2007 | Adler | |
| 2004/0085954 A1 * | 5/2004 | Iacovino et al. | 370/385 |

OTHER PUBLICATIONS

Non-final Office Action for related co-pending U.S. Appl. No. 10/678,486.
Final Office Action for related co-pending U.S. Appl. No. 10/678,486.

* cited by examiner

*Primary Examiner*—Firmin Backer
*Assistant Examiner*—Farah Faroul
(74) *Attorney, Agent, or Firm*—Guerin & Rodriguez, LLP; Michael A. Rodriguez (57) ABSTRACT

Described are a system and method for forwarding K-bytes between optical cards in a communication system. The system includes a first card and second card each connected to a backplane. The second card obtains protection-signaling information from an incoming signal arriving at the second card from over a network. The second card generates an out-of-band signal having the protection-signaling information, and transmits the out-of-band signal having the protection-signaling information to the first card in the network element. In one embodiment, the first card is a cross-connect card, and the cross-connect card simultaneously transmits the out-of-band signal with the protection-signaling information to a plurality of cards in the system.

19 Claims, 10 Drawing Sheets

SYSTEM AND METHOD OF FORWARDING K-BYTES BETWEEN OPTICAL CARDS IN A COMMUNICATIONS SYSTEM

FIELD OF THE INVENTION

The invention relates generally to optical telecommunications systems. More particularly, the invention relates to a method and system of communicating status and protection information between cards in a communication system.

BACKGROUND

The standard for optical transport of telecommunications in North America is Synchronous Optical Network or SONET and its European variant is Synchronous Digital Hierarchy or SDH. The SONET and SDH standards specify various protection schemes such as line protection and path protection. Conventionally, a line comprises one or more SONET sections or spans between SONET network elements. A path is a logical connection between a point where a Synchronous Transport Signal (STS) or a Virtual Tributary (VT) is multiplexed into the transport network and the point where the signal is demultiplexed.

Line and path protection schemes depend upon the various transport network architectures in which the schemes are operating, such as linear networks and ring networks (virtual line-switched ring or VLSR, unidirectional path-switched ring or UPSR, two- and four-fiber bi-directional line switched rings or BLSR). Linear protection schemes include 1+1, 1:1, and 1:N. For 1+1 and 1:1 protection schemes, one protection path serves to protect one working path or one section protects another section. For the 1+1 protection scheme, for example, the head-end network element permanently bridges the head-end signal to both working and protection equipment to transmit the identical payload to respective working and protection equipment of the tail-end network element. The tail-end network element continuously monitors both the working and protection signals for failures and automatically selects the protection signal in the event of an optical fiber or node failure.

A 1:N protection scheme enables a single optical protection path or section to protect any one of N working paths or sections. Criteria for detecting path failure are based on parameters such as an alarm indication signal (AIS), a loss of pointer (LOP), signal degrade, and excessive bit-interleaved parity errors. Protection signaling between the head-end network element and the tail-end network element occurs over the SONET Automatic Protection Switching (APS) channel, using bytes K1 and K2 in the line overhead.

As an example of a ring protection scheme, four-fiber BLSR technology uses four fibers between adjacent network elements, two of the four fibers for carrying working traffic and the other two fibers for carrying protection traffic. The working traffic travels in opposite directions on its two fibers, while the protection traffic travels in opposite directions on its two fibers. The protection fibers are available to transport any traffic needing bandwidth in the event of a failure in the network. In effect, this bandwidth is shared among all the circuits in the ring.

Each protection scheme has associated requirements. One requirement is the time within which a network element is to identify a fault, and another is the time within which to take corrective action. For example, for an STS-managed BLSR network architecture with no extra traffic, the network element needs to detect a fiber cut in less than 10 ms and then switch the traffic to a redundant fiber. This switch needs to occur throughout the ring in less than 50 ms. Other network architectures have different timing requirements.

To satisfy these timing requirements during a protection switch operation, a network element traditionally embedded protection signaling in the data stream (i.e., referred to as in-band signaling), using unused or borrowed bytes from the protocol. The success of such in-band signaling relied upon the functional compatibility among those devices that inserted and extracted the protection information into and from the data stream. Compatibility between in-band signaling mechanisms, however, is generally absent between devices produced by different equipment vendors. There is a need, therefore, for a protection signaling mechanism and method capable of achieving the low latency and high bandwidth requirements for supporting line and path protection in a communications network.

SUMMARY

In one aspect, the invention features a method of communicating protection-signaling information between cards in a network element. An incoming signal is received at a first card of a network element from over a network. Protection-signaling information obtained from the incoming signal is incorporated into an out-of-band signal. The out-of-band signal is transmitted with the protection-signaling information incorporated therein from the first card to a second card in the network element over a link between the cards.

In another aspect, the invention features a method of communicating protection-signaling information between cards in a network element. Protection-signaling information is transmitted from a plurality of tributary cards to a cross-connect card. The protection-signaling information obtained by the cross-connection card from the plurality of tributary cards is collected and incorporated into an out-of-band signal. The out-of-band signal, with the collected protection-signaling information, is simultaneously transmitted from the cross-connect card to each tributary card in the plurality of tributary cards.

In yet another aspect, the invention features a network element comprising a backplane and a first card connected to the backplane. A second card is connected to the backplane and is in communication with the first card. The second card obtains protection-signaling information from an incoming signal arriving from over a network and generates an out-of-band signal having the protection-signaling information. The second card transmits the out-of-band signal having the protection-signaling information to the first card in the network element.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The invention features an out-of-band communication protocol for conveying protection-signaling information, status information, or both, between cards of a network element. As used herein, out-of-band signaling means signaling that occurs independently of or separately from the signaling carrying the data traffic. The protocol satisfies the low-latency timing requirements of protection switching operations by transmitting the out-of-band signaling at a frame rate used for synchronous data transmission (i.e., SONET and SDH). This out-of-band signaling also provides high-bandwidth for communicating large quantities of protection information among the cards of the network element. Although the following description refers primarily to the SONET standard for optical transport, the principles of the invention described herein apply also to the SDH standard.

Figure 1:
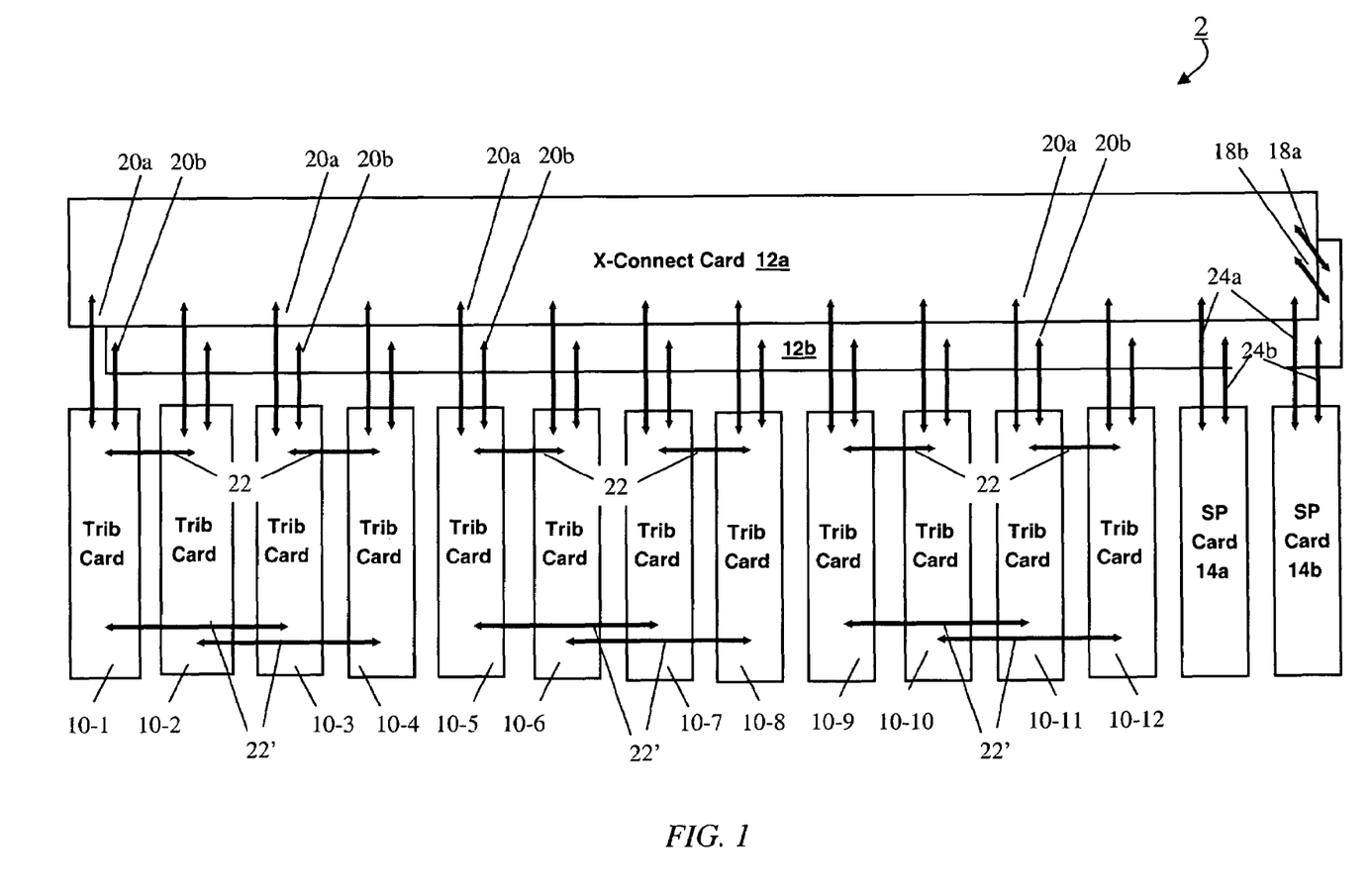
FIG. 1 is a diagram of an embodiment of a network element constructed in accordance with the principles of the invention.

FIG. 1 shows an embodiment of a network element or shelf 2, constructed in accordance with the principles of the invention, for use in a communications network. The shelf 2 includes a plurality of tributary cards 10-1 through 10-12 (generally, Trib card 10), redundant cross-connect cards 12a, 12b (generally, XC card 12), redundant shelf processor cards 14a, 14b (generally, SP card 14), and a backplane (not shown). The invention can be embodied in network elements operating with fewer or more than the twelve Trib cards shown, without redundant XC cards 12, without redundant SP cards 14, or any combination thereof. Network elements without any XC cards 12, that is, having Trib cards 12 in the slot or slots occupied by the XC cards 12, such as for example those used in transponder applications (i.e., wavelength translation), can also practice the invention. The invention can also be employed to accomplish protection switching in the absence of any SP cards 14 in the network element 2.

The Trib cards 10 generally receive data signals and produce synchronous transport signals therefrom. Different types of Trib cards 10, for handling different signal formats and different signal rates, can be used to practice the invention. For example, signal formats that can be supported include, but are not limited to, DS1, DS3, E1, E3, Ethernet, OC-3, OC-12, OC-48, and OC-192 (also referred to as high-speed tributary cards). Trib cards supporting electrical signals (e.g., DS1, DS3) are generally referred to as copper tributary cards; those supporting optical signals as optical tributary cards. For optical tributary cards, incoming and outgoing optical signals enter and exit the tributary card through ports in the faceplate. Embodiments of Trib cards 10 have from one (e.g., an OC-192 port) to 32 ports. For copper tributary cards, incoming and outgoing electrical signals pass through an input/output interface card (not shown) before passing to or coming from the tributary card by way of the backplane.

From an operations perspective, the SP cards 14 are the controller of the shelf. The SP cards 14, in general, control the Trib cards 10 and XC cards 12 for provisioning purposes. Under user control, the SP cards 14 determine the routes taken by traffic between Trib cards 10. The SP cards 14 also collect alarms from the Trib cards 10, determines which alarms are relevant, and forwards those relevant alarms up to the operations, administration and management network (overlaying the communications network).

During general operation of the shelf 2, the Trib card 10-1 (for example) receives incoming data signals, e.g., through a user-network interface or through a network-network interface. As used herein, an incoming signal is a payload-bearing (i.e., data) signal. Consider, for exemplary purposes only, that the incoming signal is a DS1 signal. The Trib card 10-1 maps and adapts the DS1 signal into the payload of an electrical STS-1 signal, and sends the STS-1 signal to the XC cards 12 over the back plane. The XC cards 12 switch the data signals to another Trib card 10 in the shelf 2. For example, the XC cards 12 can forward the STS signal to the Trib card 10-4. For illustration purposes only, assume that the Trib card 10-4 is an optical card which produces an optical signal (e.g., OC-48) representative of at least the STS signal, and places the optical signal onto the communications network. During this operation, the XC cards 12 provide equipment redundancy. Identical STS signals pass from the Trib card 10-1 to both XC cards 12 and from both XC cards 12 to the Trib card 10-4. The Trib card 10-4 selects between the identical STS signal streams.

The XC cards 12 operate without regard to the type of tributary cards (i.e., DS1, DS3, OC-48) between which the STS signals are being switched. In one embodiment, the backplane operates at an STS-48 rate. The XC cards can separate the 48 STS-1s received over a link into individual STS-1 units and send different ones of the STS-1 units to different Trib cards 10. In another embodiment, the XC card 12 can separate 1344 VT1.5s received over a link into individual VT1.5s, and send different ones to different Trib cards 10.

The out-of-band signaling associated with the protocol of the invention traverses a variety of links between the various cards 10, 12, 14 in the shelf 2. Each link is a separate physical connection on the backplane between a pair of cards 10, 12, 14. These links are bi-directional and dedicated to carrying the out-of-band signaling of the protocol; that is, other links (not shown) carry the STS signals through the shelf 2, as described above.

The XC cards 12 communicate with each other over redundant links 18a, 18b (generally, xc-xc links 18) and with each Trib card 10 over links 20a, 20b. When the links 20a, 20b are carrying out-of-band signals from a Trib card 10 to the XC cards 12, the links are generally referred to as trib-xc links 20. When the links 20a, 20b carry out-of-band signals from an XC card 12 to a Trib card 10, such links are referred to as xc-trib links 20.

In the shelf 2, the Trib cards 10 are paired (for implementing various protection schemes, such as 1+1 protection. Links 22, 22' (generally, trib-trib links 22) provide communication paths between pairs of Trib cards 10 that are physically adjacent in the shelf 2. Tributary links 22' are double-width links which, in one embodiment, enable tributary cards of double width to communicate with an adjacent double-width tributary card.

The SP cards 14 are each in communication with the XC cards 12 over links 24a, 24b. When carrying out-of-band signals from the SP cards 14 to the XC cards 12, the links 24a, 24b are generally referred to as sp-xc links 24. When carrying out-of-band signals from the XC cards 12 to the SP cards 14, the links 24a, 24b are referred to as xc-sp links 24.

In general overview, the cards 10, 12, and 14 within the shelf 2 exchange information over the various links 18, 20, 22, and 24 in accordance with the out-of-band communication protocol of the invention. The information exchanged among the cards includes 1) status and protection information, such as card status, path status, line status, master-slave status, and path and line protection-switching protocol bytes (e.g., K1, K2, and G1 bytes of SONET/SDH), and 2) messages, such as line protection requests and acknowledgments, and software messaging.

Card status is one type of status information that includes a variety of card-related information, such as a card latch-open status, link operational status, card failure, software ready, and master-slave status. Master-slave status information is another type of status information exchanged between the cards 10, 12, 14. Because the shelf 2 employs redundancy, the Trib cards and SP cards need to know which XC card 12 is the master and which XC card is the slave. Finite state machines implemented on both XC cards 12 negotiate with each other over a link dedicated to this purpose, (i.e., a different link than the protocol links) to determine the master-slave status. The XC cards 12 each sends the negotiated master-slave state (referred herein as XC MS status). Each Trib card 10 determines which XC card 12 is master from the master-slave statuses received from the XC cards. The exchange of other master-slaves statuses also occurs in the shelf 2. The XC cards also transmit a Synchronous Equipment Timing Source or SETS master-slave status to the other cards in the shelf 2, and the Trib cards 10 send master-slave statuses to the XC cards 12.

One type of exchanged protection information includes a path status byte (i.e., the G1 byte of the path overhead) for conveying path terminating status and performance back to the originating path terminating equipment. Another type is represented by the protection switching protocol bytes K1 and K2 of the transport overhead for carrying the protection protocol used to coordinate protection switching between the near-end and far-end shelves (i.e., the points in the communications network where the transport overhead is inserted and terminated, respectively).

Figure 2:
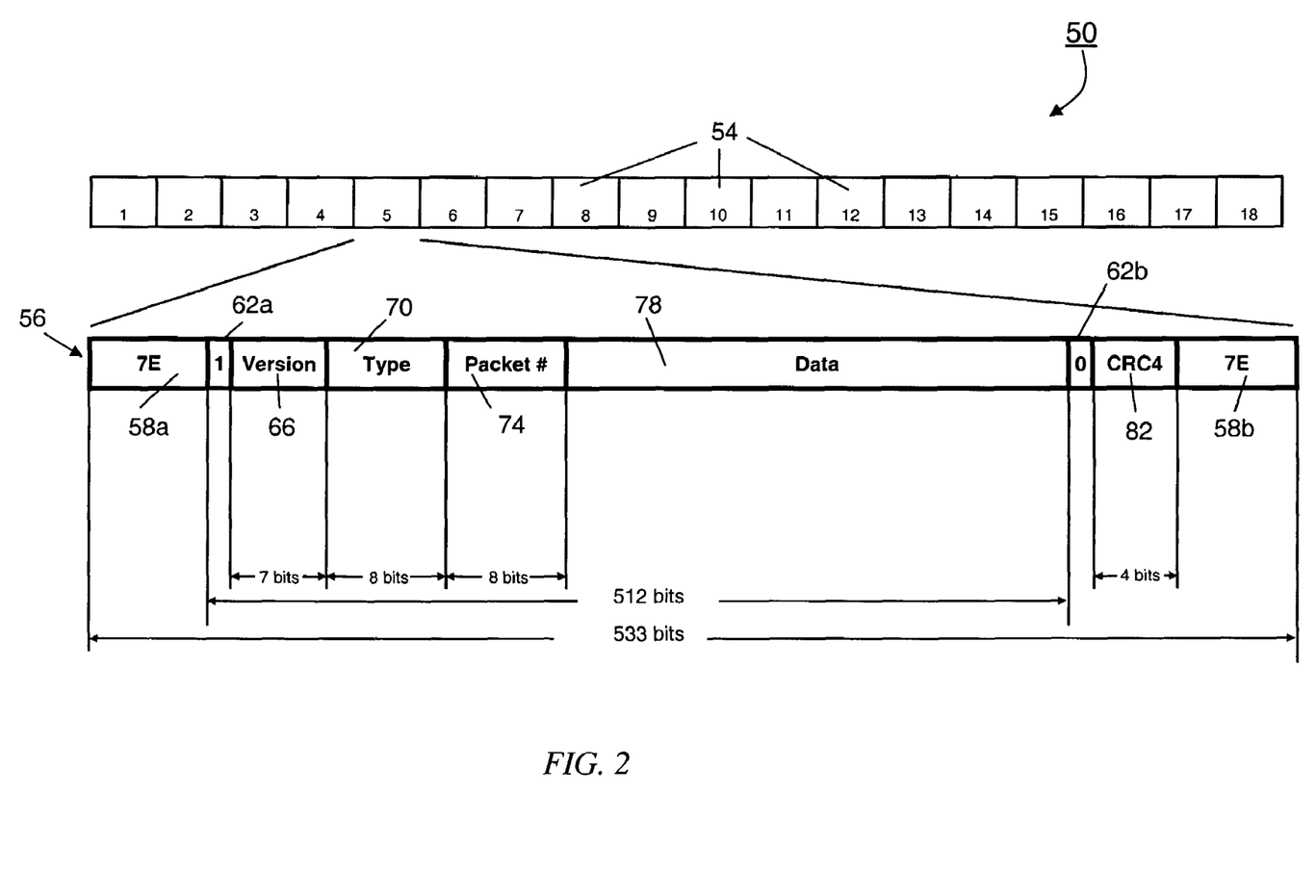
FIG. 2 is a block diagram of an exemplary format of frames transmitted over certain links between cards in the network element.

FIG. 2 shows an exemplary format of a frame 50 used with the protocol of the invention to communicate information among the cards 10, 12, and 14. The frame format has a plurality of timeslots 54. During transmission of the frame 50, each timeslot 54 carries one packet 56. In one embodiment, the frame 50 has eighteen timeslots 54, with each timeslot 54 capable of supporting 540 bits of information. In this embodiment, each packet 56 is 533 bits in length. The packet 56 has a plurality of fields, including two eight-bit packet-delimiters 58a, 58b (generally, delimiter 58), start and stop bits 62a, 62b, a seven-bit version field 66, an eight-bit type field 70, an eight-bit packet number field 74, a 480-bit data field 78, and four cyclic redundancy checking (CRC) bits 82.

The packet-delimiters 58a, 58b are for implementing HDLC formatting for each packet 56. For HDLC formatting, each delimiter 58 has a hexadecimal byte value of 7E. HDLC requires bit stuffing so that "7E" data patterns do not appear within a packet 56. Start and stop bits 62a, 62b store bit values of "1" and "0", respectively, in one embodiment of the packets 56. The CRC bits 82 enable error checking.

During operation of the shelf 2, each card 10, 12, 14 continuously transmits frames 50 of packets 56 over an appropriate link 20, 22, 24. The cards 10, 12, 14 operate at the same frame rate. Preferably, this frame rate is one frame every 125 us (or 8000 frames per second), so as to correspond with the frame rate used to transmit SONET frames. The 8000 frames per second frame rate enables the same internal clock (i.e., 78 MHz) used for generating STS-n and OC-n signals to also be used for generating out-of-band signaling of the invention. In one embodiment, the transmission of frames from each of the cards 10, 12, 14 is synchronized; that is, transmission of the start of each frame occurs concurrently at each card.

The packets 56 in each transmitted frame 50 follow a predetermined timeslot schedule. Packets 56 carry different types of messages, and different types of messages are transmitted at different rates. Message types vary based on the type of conveyed data. Messages that are transmitted every frame occupy the same timeslot or timeslots in each frame. If, for example, software-messaging packets are assigned timeslot number 16, a software-messaging packet appears in timeslot 16 of every frame 50. Messages that occur less frequently (e.g., every other frame) can share their timeslots with other messages. The card receiving the frames 50 does not rely on any particular timeslot schedule to process the information conveyed by the frames 50. Rather, the receiving card uses the HDLC framing, the start and stop bits, and the data type to determine the nature of the packets 56 in the frame 50. Any timing differences between the transmitting card and receiving card are thus of no effect.

Tributary-to-Tributary Links

Frames 50 continuously pass between pairs of cards 10, 12, 14 over the various links 18, 20, 22, 24 at a given frame rate. Over the trib-trib links 22, adjacent Trib cards 10 exchange frames containing various types of information. Types of exchanged information include the status of the Trib card 10, K1 and K2 bytes, G1-bytes, and software messaging. In one embodiment, each Trib card 10 includes its tributary-card status, a G1 byte for each STS-1 in the received signal (e.g., 192 G1 bytes for OC-192 signals), and a software message in every transmitted frame 50. When the given frame rate is 8000 frames per second, this information is sent every 125 us. Also in this embodiment, sets of K-bytes (i.e., K1 and K2 bytes), one set for each port of each Trib card 10, pass between adjacent Trib cards 10 in every other frame. Accordingly, the latency associated with the transmission of K-bytes is 250 us (for 125 us frames).

In one embodiment, sixteen bits per frame are allocated to carry the tributary-card status, eight bits for forwarding the G1 byte for each STS-1, 512 bits for a software message, and 18 bits for each set of extended K-bytes. Once bit stuffing is accounted for, the data of the software message is approximately 400 bits in length. A typical use of software messaging is to exchange line protection status and commands between adjacent Trib cards 10. Typical messages include protection-status, sync-status, and provisioning-status messages. One skilled in the art will recognize that other field sizes and bit assignments can be used for the various types of information without departing from the principles of the invention.

Table 1 below summarizes the various types of exchanged information, bit allocations, and transmission latency for the exemplary embodiment described above. Table 2 below shows an example of bit assignments for communicating the tributary card status.

TABLE 1

(Exchanged Information Description)

| Information | Description | Bits | Latency |
|---|---|---|---|
| Tributary Card Status | Status of Tributary Card | 16 bits | 1 frame = 125 us |
| K-bytes | For forwarding K-bytes between Tributary Cards | 18 bits for extended K-bytes for each port on the tributary card. | 2 frames = 250 us |
| G1 Bytes | For forwarding G1-bytes between Tributary Cards | 8 bits 384 STS-1s | 1 frame = 125 us |
| Software Messaging | Trib card-to-Trib card software messaging | 512 bits | 1 frame = 125 us |

TABLE 2

(Tributary Card-status Bytes)

| Bits | Description |
|---|---|
| 0 | Card latch-open status |
| 1 | Software ready flag |
| 2 | Card failure indicator |
| 3 | Link operational flag |
| 4:6 | Master/slave status of Tributary card |
| 7:15 | Available for use for other status information. |

Cross-Connect-to-Cross-Connect Links

Cross-connect cards 12 continuously exchange frames containing various types of information with each other over xc-xc links 22. Such information includes card status information (similar to those statuses for a Trib card 10 with an additional SETS Master/Slave status) and software messaging.

Trib-to-XC Links and XC-to-Trib Links

Tributary cards 10 and XC cards 12 continuously exchange frames containing various types of information over links 20. Examples of information passing from a Trib card 10 to an XC card 12 over the trib-xc links 20 include a tributary-card status, an STS/VT path status for each STS-1 or VT-1.5 in the received signal (e.g., 192 STS paths for OC-192 signals), a line status for each port of the trib card, a line protection request for each port of the trib card, and software messaging. The tributary-card status and software messaging are the same as that described above in connection with the trib-to-trib links. Also, in one embodiment, nine bits are allocated to carry each STS path status (4 bits for each VT path status), six bits for the line status, and eighteen bits for each set of extended K-bytes, and eight bits for each line protection request. Each Trib card 10 transmits its tributary-card status and a software message in every frame (i.e., 125 us), line status and K-byte information in every other frame (i.e., 250 us), and STS path status and VT path status in every frame. Because of the amount of STS path and VT path information to be transmitted, the information is divided over 8 frames for STS path status and divided over 16 frames for the VT path status. Thus, the latencies for transmitting all of the STS and VT path status information are 1 ms and 2 ms, respectively. Also, in another embodiment, one-half of the K-byte information is transmitted every frame; the latency for transmitting all of the K-byte information is again 250 us.

Table 3 below summarizes the various types of exchanged information, bit allocations, and transmission latency for the exemplary embodiment described above.

TABLE 3

(Trib-to-XC Exchanged Information)

| Information | Description | Bits | Latency |
|---|---|---|---|
| Tributary Card Status | Status of Tributary Card | 16 bits | 1 frame = 125 us |
| Path Status | STS/VT path status | 9 bits for each STS, and 4 bits for each VT-1.5 | for STS status, every eight frames or 1 ms, and for VT status, every 16 frames for 2 ms latency |
| Line Status | For forwarding line status and K-bytes to the XC cards. | 6 bits for line status, 18 bits for each set of extended K-bytes, one set for each port on a given tributary card. | Every 2 frames for 250 us latency. |
| Line Protection | For sending line protection request to the XC cards. | 8 bits for each request, one or two requests for each port of the trib card. | Every 2 frames for 250 us latency. |
| Software Messaging | Trib card-to-XC card software messaging of protection status information. | 512 bits | Every frame for 125 us latency. |

Figure 3:
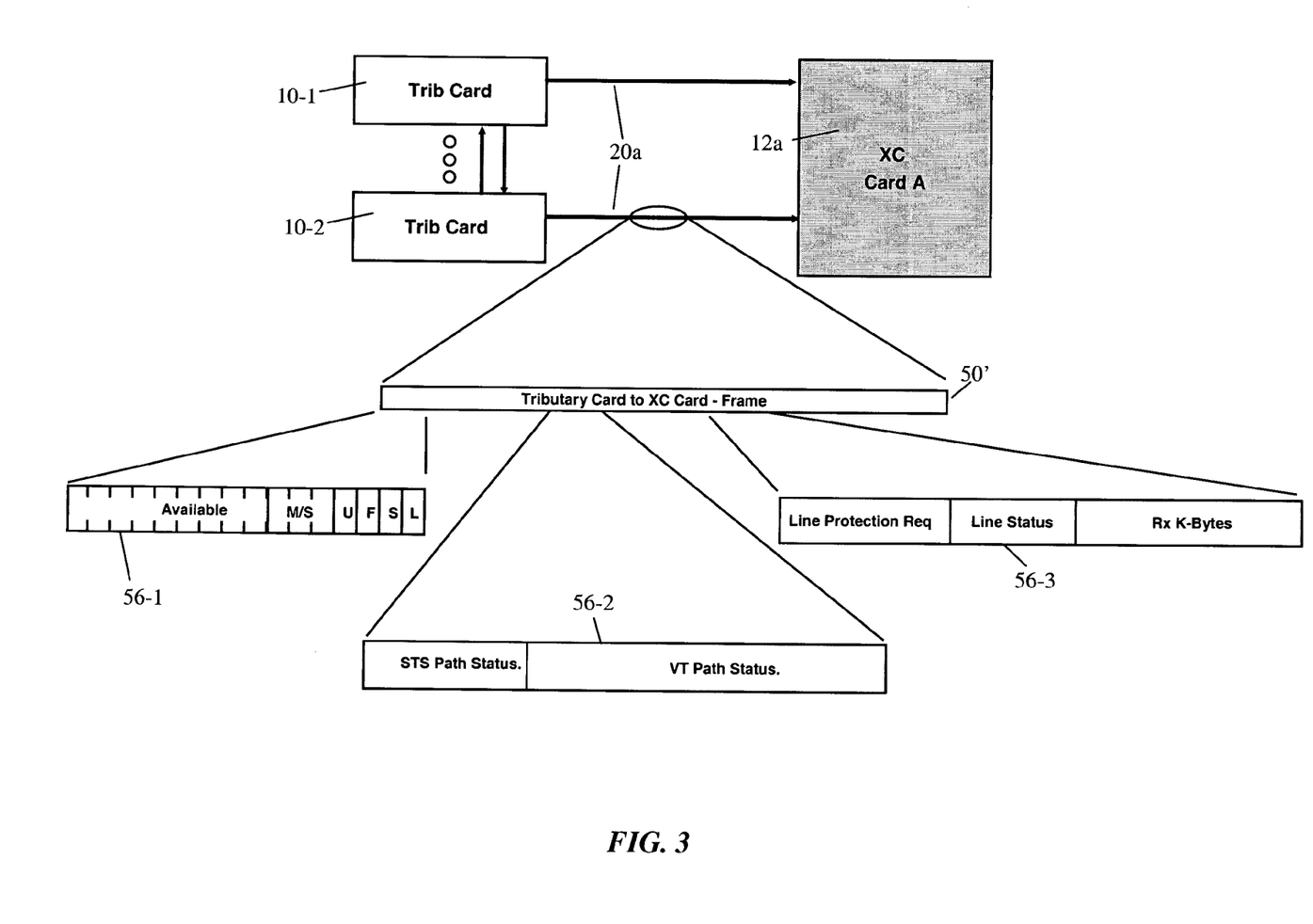
FIG. 3 is a block diagram of an example of packets in a frame transmitted over a tributary-to-cross-connect link from a tributary card to a cross-connect card.

FIG. 3 shows an example of a frame 50' transmitted from the tributary card 10-1 (for example) to the XC card 12a over the trib-xc link 20a. Only one XC card 12a is shown for simplifying the description. One of the packets 56-1 of the frame 50' includes the various tributary card statuses (denoted M/S for master/slave status, U for link operational status, F for card failure indicator, S for software ready flag, and L for card latch-open status). For illustration purposes, this packet 56-1 is in one of the low-numbered timeslots 54 of the frame 50. Another packet 56-2, located in a higher-numbered timeslot of the frame 50' than the status packet 56-1, includes the path protection signaling from the Trib card 10. The XC card 12a uses the path protection status information to control UPSR/SNCP (Sub-network Connection Protection Ring) path protection on the XC card 12a. As indicated above, the STS and VT path status information is divided over a plurality of frames: eight frames for the STS path status information, and sixteen frames for the VT path status information.

bits for extended K-bytes for each port of the Trib card 10 in the shelf 2. Eight bits are used for sending a line protection acknowledgment to the specific tributary card that sent a line protection request to the XC card 12. In one embodiment, each XC card 12 broadcasts (i.e., simultaneously transmits to every Trib card 10) its XC-card status, broadcasts a tributary-card status broadcast, and issues a software message in every frame. Whereas the broadcast XC-card status and tributary-cast status are the same to each Trib card 10, the XC card 12 can send a unique software message to each Trib card 10. The line status broadcast and K-byte information are broadcast in every other frame. Line protection acknowledgments are transmitted in every other frame.

Table 4 below summarizes the various types of exchanged information, bit allocations, and transmission latency for the exemplary embodiment of the XC-Trib links described above.

TABLE 4

(XC-to-Trib Exchanged Information)

| Information | Description | Bits Allocated for Information | Latency |
| --- | --- | --- | --- |
| XC Card Status | Status of Cross-connect Card | 16 bits | Every frame for 125 us latency |
| Tributary Card Status Broadcast | Collection of tributary card status from all tributary cards. | 16 bits per tributary card | Every frame for 125 us latency |
| Line Status Broadcast | Collection of line statuses and K-bytes from all tributary cards. | 6 bits for line status and 18 bits for extended K-bytes for each tributary card. | Information Divided over 2 frames for 250 us latency. |
| Line Protection Acknowledgment | Acknowledge line protection request from a specific tributary card. | 8 bits for each ack, one or two acks for each port in the tributary card. | Every 2 frames for 250 us latency. |
| Software Messaging | XC card-to-tributary card software messaging. | 512 bits | Every frame for 125 us latency. |

Another packet 56-3, located in a higher-numbered timeslot of the frame 50' than the status packet 56-2, includes the line protection signaling from the Trib card 10-2. If, for example, the Trib card 10-2 has sixteen optical ports, the Trib card 10-2 transmits 32 line protection requests to indicate the particular traffic configuration to be applied, 16 line statuses, and 16 sets of K-bytes to the XC card 12a. (Note that K-bytes can be sent to an adjacent trib card during a single frame interval by two paths: 1) over a trib-trib link 22, and 2) by way of the XC card. Although the K-bytes sent over one path are typically identical to those sent over the other path, the K-bytes can be different. To accommodate the possibility of unique K-bytes, and thus to be able to provide the XC cards 12 with line protection information corresponding to each unique set of K-bytes, the number of line protection requests that are included in a transmitted frame equals twice the number of ports in the trib card 10. Thus, for a 16-port trib card, 32 line protection requests are used.) Another packet in the frame 50', not shown, carries the software messaging.

Figure 4:
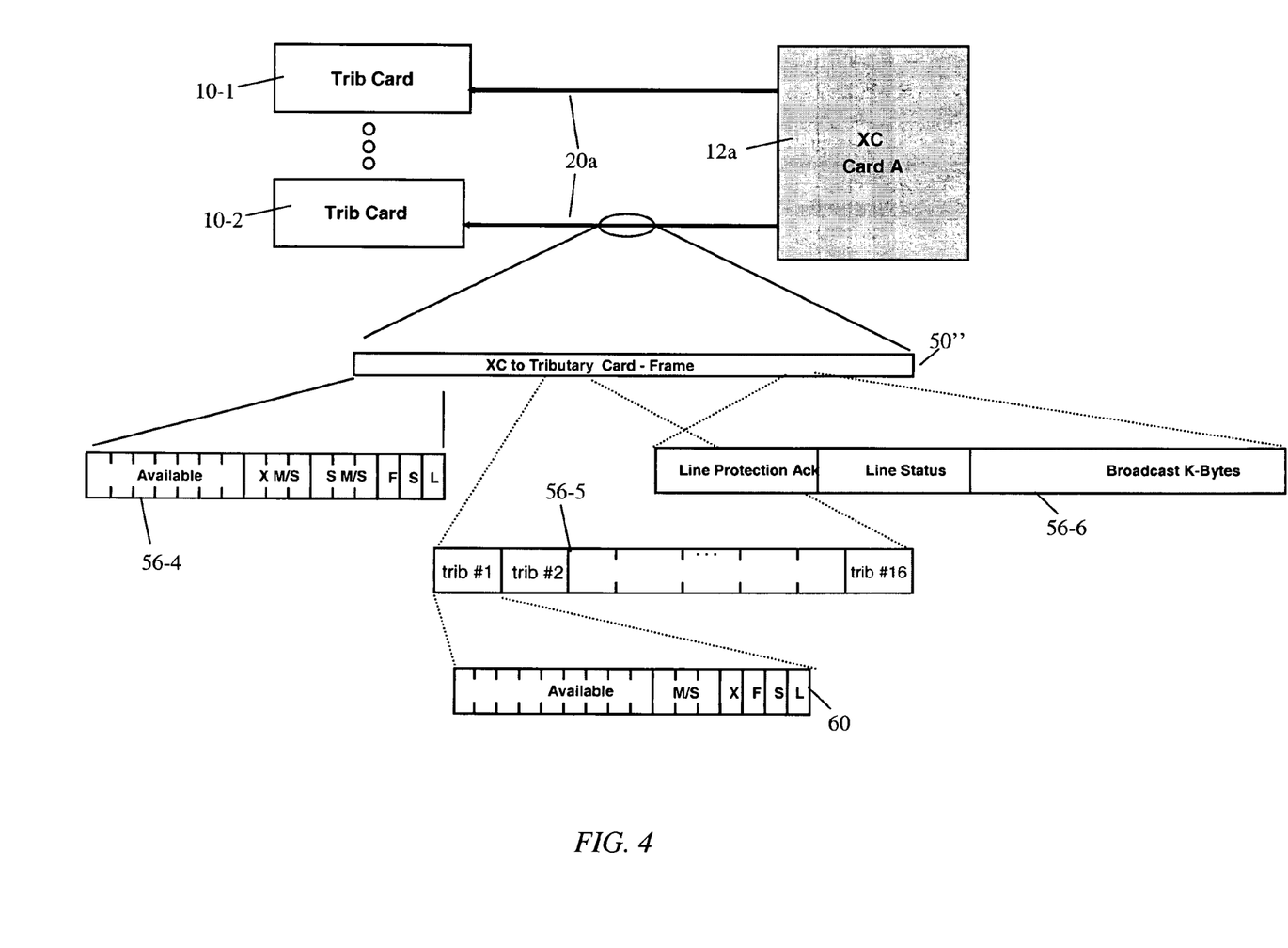
FIG. 4 is a block diagram of an example of packets in a frame transmitted over a cross-connect-to-tributary link from a cross-connect card to a tributary card.

When the links 20 carry information from a XC card 12 to a tributary card 10, as shown in FIG. 4, examples of conveyed information include the xc-card status, tributary-card status broadcast, the line status broadcast, line protection acknowledgment, and software messaging. In one embodiment, the xc-card status and software messaging are similar to those described above in connection with the xc-to-xc links. Also, the tributary-card status broadcast uses sixteen bits for the tributary-card status of each Trib card 10 in the shelf 2. The line status broadcast uses six bits for line status and eighteen FIG. 4 shows an example of a frame 50" transmitted from the XC card 12a to the Trib card 10 over an xc-trib link 20a. One of the packets 56-4 of the frame 50" includes the various XC card statuses (denoted X M/S for master/slave status of the XC card, S M/S for the SETS M/S status, F for card failure indicator, S for software ready flag, and L for card latch-open status). For illustration purposes, this XC status packet 56-4 is in one of the low-numbered timeslots of the frame. Another packet 56-5, located in a higher-numbered timeslot of the frame 50" than the XC status packet 56-4, includes the collection of Trib card statuses received from the Trib cards 10. As shown, the packet 56-5 is a concatenation of the status information 60 received from each of the Trib cards 10. The XC card 12a updates the link-operational field (X) of the status information 60 to indicate the status of the trib-xc link 20a to each of the Trib cards 10.

In another packet 56-6 in the frame 50", the XC card 12a transmits a line protection acknowledgment to the Trib card 10-2, indicating completion of the line protection request received previously from that tributary card. The XC card 12a also collects the line status and K-byte information from all Trib cards 10 and includes the collected information in the packet 56-6 of the frame 50". Whereas the line protection acknowledgment is specific to the Trib card 10-2, the same line status and K-byte information is transmitted to each of the Trib cards in the shelf 2.

SP-to-XC Links and XC-to-SP Links

Shelf processor cards 14 and XC cards 12 exchange frames containing various types of information over sp-xc or xc-sp links 24. Such information includes card status information and software messaging. The SP link 24 operates at a slower rate, 38 MHz, or half that of the XC and Trib cards. The frame rate is 8000 frames per second, but each frame traversing the sp-xc link 24 has 9 packets instead of 18.

Copper Protection Signaling

Figure 5:
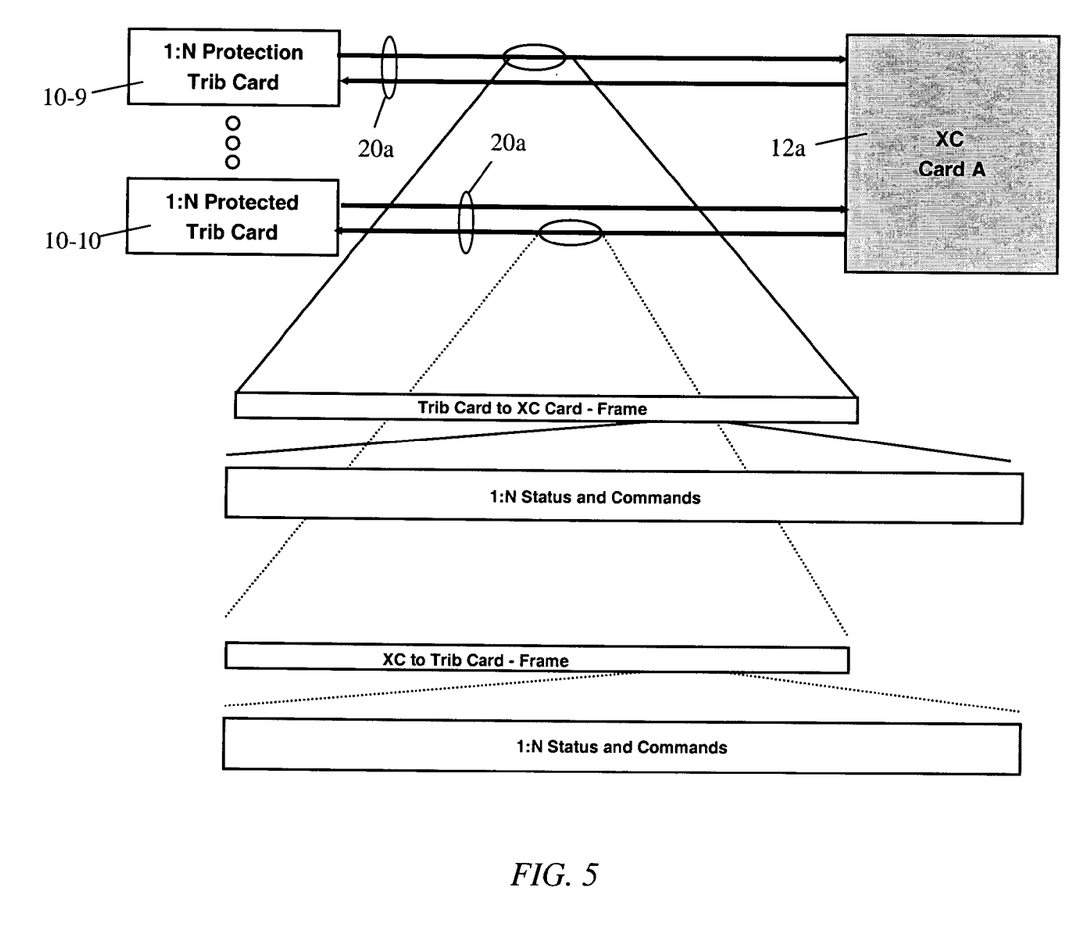
FIG. 5 is a block diagram of an example a frame exchanged between a 1:N protection tributary card and a cross-connect card, and a 1:N protected tributary card and the cross-connect card.

In one embodiment, a subset of the Trib cards 10 forms a 1:N electrical equipment protection group. In a 1:4 protection group (N=4), for example, one protection tributary card (hereafter, a 1:N Protection Trib card) protects 4 working tributary cards (hereafter, 1:N Protected Trib cards). If any of the working tributary cards faults, the Protection Trib card carries the traffic previously carried by the faulting Protected Trib card. To achieve this protection, the protection cards and working cards signal each other. Instead of the line status and K-bytes transmitted by optical tributary cards, as described above, the electrical equipment tributary cards transmit status and command information for 1:N protection to the XC card 12a over the trib-xc link 20a, as shown in FIG. 5. The XC card 12a collects this status and command information and broadcasts it to the tributary cards over the xc-trib link 20a, also shown in FIG. 5. Optical tributary cards do not process this information because each is directed not to listen to the electrical slots. The service signal (e.g., DS1, DS3) enters an input/output interface card before passing to the 1:N Protected Trib cards 10.

General Operation

Figure 6:
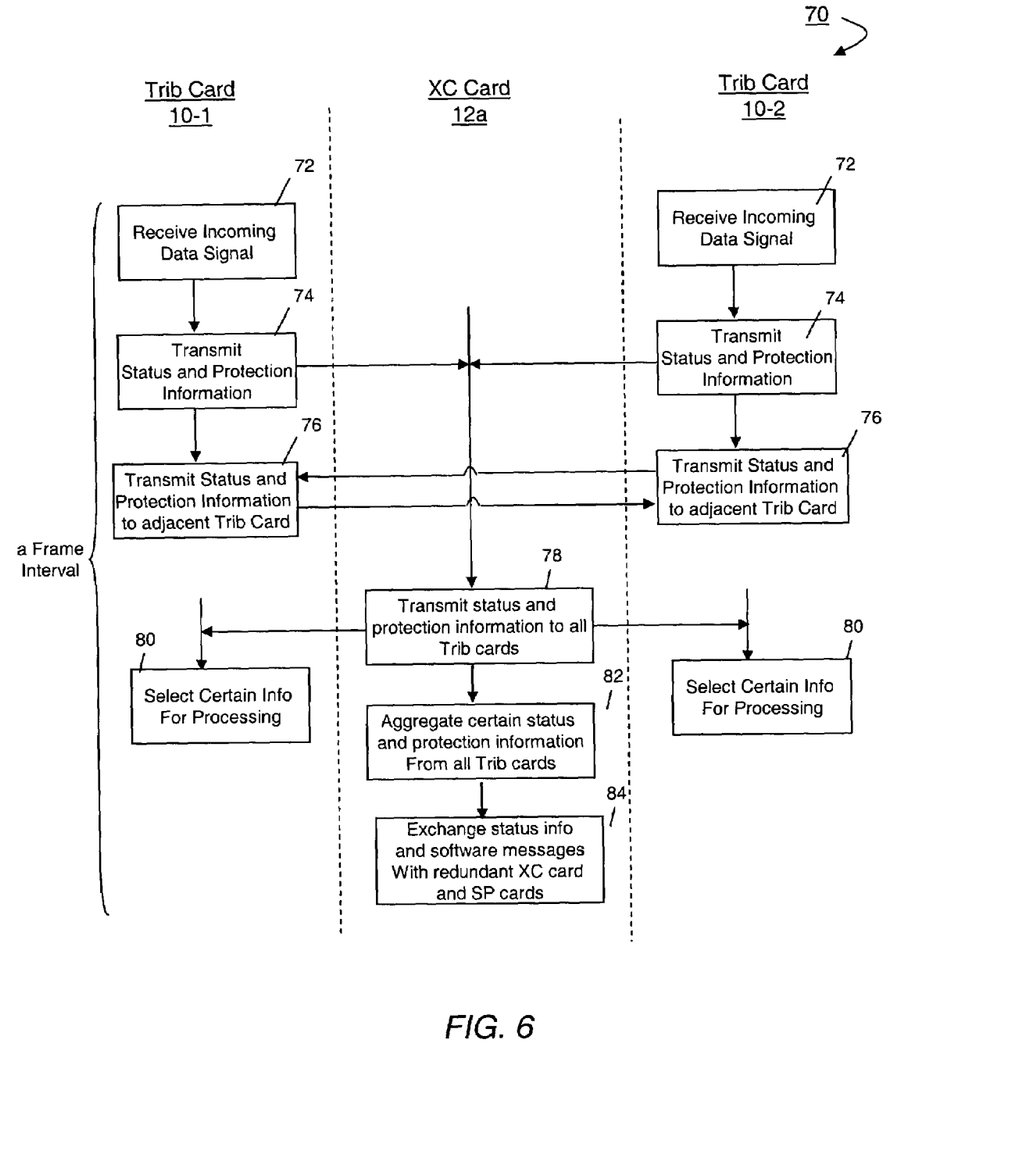
FIG. 6 is a flow diagram of an embodiment of a process for transmitting status and protection information between cards in the network element of FIG. 1.

FIG. 6 shows an embodiment of a process 70 for communicating status and protection information among the cards of the shelf 2 during a single frame interval. For the purpose of describing the process 70, a frame interval represents the period of time in which one frame (e.g., 125 us) is transmitted. The start of the frame interval can coincide with the transmission of the first bit of a frame by none, one, some, or all of the cards 10, 12, 14 in the shelf 2, but such frame synchronization does not need to occur to practice the invention. For details regarding the type of status and protection communicated during the frame interval, refer to the Tables 1, 2 and 3 and FIG. 3 and FIG. 4 above. In FIG. 6, Trib cards 10-1 and 10-2 are shown as representative examples of Trib cards 10 in general and of a pair of adjacent tributary cards in particular. Discussion of the redundant XC card 12b is generally excluded to simplify the description.

During a frame interval, the Trib cards 10-1, 10-2 receive (step 72) incoming data signals, transmit (step 74) status and protection information to the XC card 12a over respective trib-xc links 20a, and exchange (step 76) status and protection information with each other over their shared trib-trib link 22. Also during this frame interval, the XC card 12a transmits (step 78) status and protection information to each Trib card 10 over the xc-trib links 20a. Each Trib card 10 processes (step 80) a select portion of the information obtained from the XC card 12a. (Each Trib card 10 knows from provisioning which information coming from the XC card 12a to process.)

The XC card 12a also aggregates (step 82) certain status and protection information received from each Trib cards 10. A portion of the information transmitted in step 78, the XC card 12a aggregated during a previous frame interval. The information being aggregated during the current frame interval, the XC card 12a will simultaneously transmit to each Trib card 10 during the next frame interval. The XC card 12a also exchanges (step 84) status and software messages with the other XC card 12b over the xc-xc links 18 and status and software messages with the SP cards 14 over the xc-sp link or sp-xc links 24. During each successive frame interval, each card 10, 12, 14 repeats their respective steps of the process 70.

EXAMPLE

Latch-Open Signaling

Figure 7:
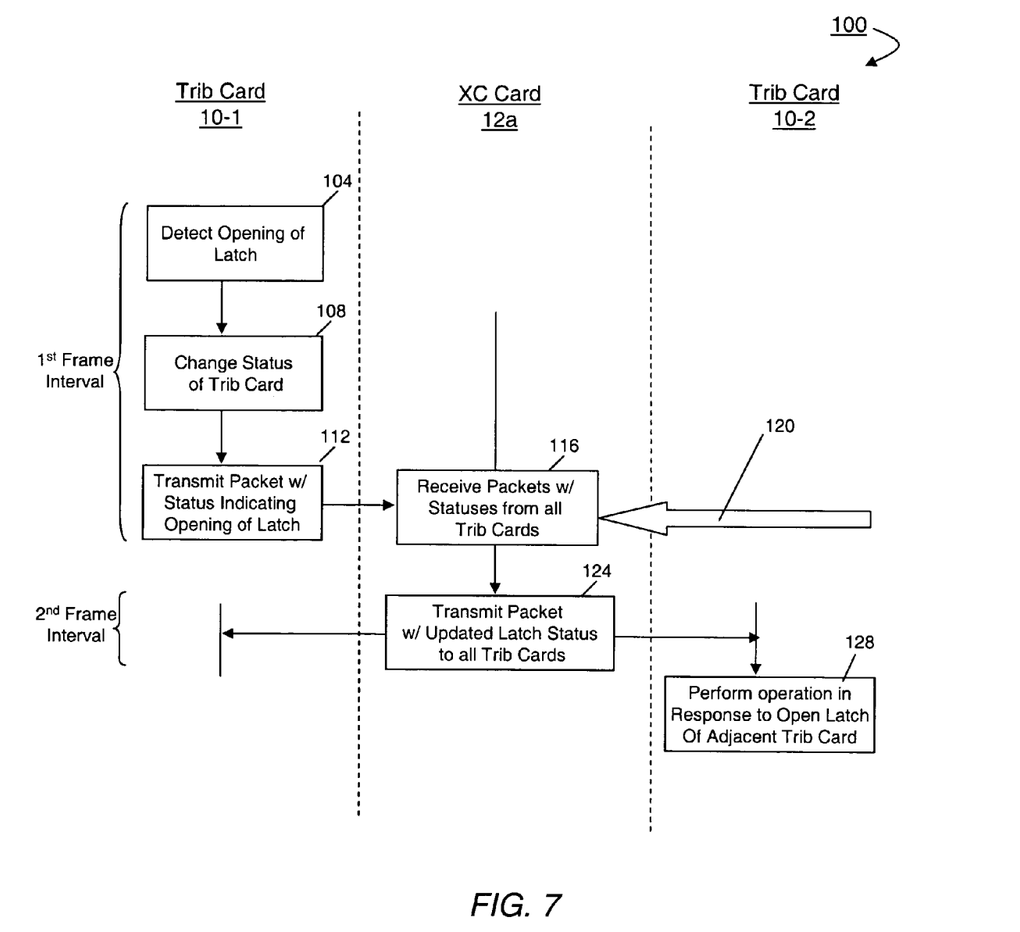
FIG. 7 is a flow diagram of an embodiment of a process for transmitting a latch-open status between cards in the network element of FIG. 1.

FIG. 7 shows an embodiment of a process 100 for communicating latch status information among the cards 10, 12, 14 of the shelf 2. In the description of the process 100, the Trib card 10-1 is used as a representative example of a Trib card 10 that sources the latch-open status information, and the Trib card 10-2 as a representative example of a Trib card 10 that receives the status information. The other cards 12, 14 can also communicate latch status information like the Trib card 10, as described below. As used herein, a frame interval means the amount of time required to transmit a frame, which in one embodiment is 125 us. The start of the frame interval may, but does not necessarily coincide with the transmission of the first bit of the frame containing the latch-open status information.

During a first frame interval, at step 104, the Trib card 10-1 detects that its latch has been opened preliminary to removal of the Trib card 10-1 from the shelf 2. The Trib card 10-1 consequently changes (step 108) its latch status to indicate that its latch is open. Over the trib-xc link 20a, the Trib card 10-1 transmits (step 112) a packet (as part of a frame) conveying the changed latch status. The XC card 12a receives (step 116) this packet and aggregates this status information with similar status information obtained from the other Trib cards 10 in the shelf 2 (represented by arrow 120). When the appropriate timeslot for transmitting the aggregated latch status arrives, the XC card 12a transmits (step 124) the aggregated status information to each Trib card 10 in the shelf 2 simultaneously. Depending upon the moment of appearance of this timeslot at the XC card 12a, the broadcast of the status information can occur during the first frame interval or during the immediately following frame interval. The other XC card 12b also receives the frame from the Trib card 10-1, but is not shown in FIG. 7 to simplify the description.

As a result of using the protocol and the associated links of the invention, the other Trib cards 10 are notified within at most two frame intervals (in one embodiment, within 250 us) of when a latch has been opened on one of the cards 10, 12, 14 in the shelf 2. Whereas disconnecting the Trib card 10-1 from the backplane can take milliseconds, the other Trib cards 10 can receive notice of the disconnection in a quarter of a millisecond. Consequently, the other Trib cards 10 have sufficient time to perform (step 128) operations in response to the opening of the latch, for example, to initiate protection switching, before the Trib card 10-1 is disconnected from the backplane of the shelf 2.

EXAMPLE

G1-Byte Forwarding

Figure 8:
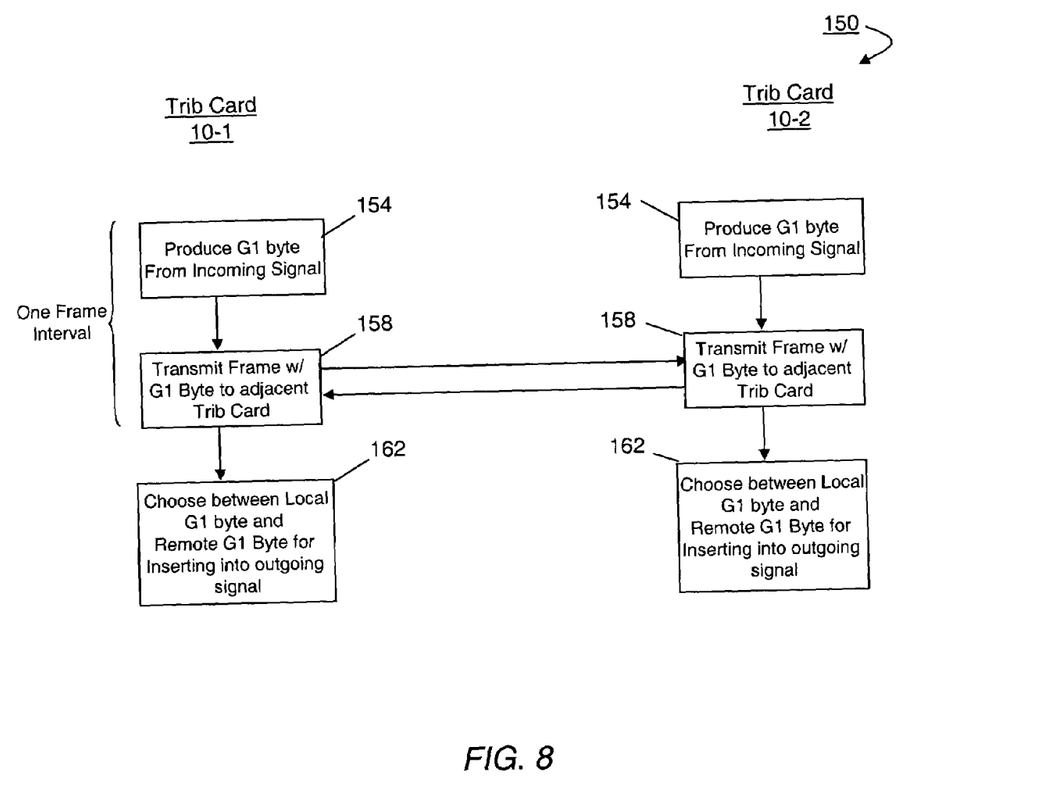
FIG. 8 is a flow diagram of an embodiment of a process for transmitting the path status byte G1 between adjacent tributary cards of the network element of FIG. 1.

FIG. 8 shows an embodiment of a process 150 for communicating the path status byte G1 of the POH between adjacent Trib cards of the shelf 2. In the description of the process 150, the Trib card 10-1 and 10-2 are used as a representative example of a pair of adjacent Trib cards that are connected by a trib-trib links 22 (or 22'). Although shown in FIG. 1 as a bi-directional link, the trib-trib link 22 between the adjacent Trib cards 10-1, 10-2 can be represented as two distinct physical connections. One connection passes from a transmitter of Trib card 10-1 to a receiver of Trib card 10-2 and the other passes from a transmitter of Trib card 10-2 to a receiver of Trib card 10-1.

For the purposes of appreciating the advantages of the invention, consider that the adjacent Trib cards 10-1, 10-2 are a 1+1 protection pair and each Trib card 10-1, 10-2 receives an incoming optical signal over an optical facility. The XC card 12a selects incoming traffic from one of the Trib cards 10-1, 10-2 for forwarding. For performance monitoring, each Trib card determines a bit error rate for its incoming signal. In general, the G1 byte, which is in the POH, is used to carry this bit error rate back to the transmitter of the incoming signal. For some applications, the G1 byte associated with the traffic being forwarded by the XC card 12a is sent back by both Trib cards 10-1, 10-2 to their respective sources of the incoming data traffic. So that its G1 byte can be transmitted back by the adjacent Trib card, if necessary, each Trib card 10-1, 10-2 forwards its G1 byte to the adjacent Trib card over the trib-trib link 22.

More specifically, a VT Aligner of each Trib card 10-1, 10-2 produces (step 154) a G1 byte based on a respective incoming optical signal. For a Trib card receiving 192 STS-1s every SONET frame, the VT Aligner produces 192 G1 bytes. In step 158, each Trib card 10-1 and 10-2 incorporates the G1 bytes in a frame and transmits that frame over the trib-trib link 22 to the adjacent Trib cards 10-2, 10-1. Presume, for the sake of the description of the process 150, that the start of the frame coincides with the start of the frame interval. Thus, within one frame interval (e.g., 125 us), the G1 bytes from the adjacent Trib card are available for transmitting over the optical facility. Each Trib card 10-1, 10-2 then determines (step 162) which G1 bytes, i.e., those locally generated or those remotely from the adjacent Trib card, to incorporate in its outgoing optical signals.

EXAMPLE

K-Byte Forwarding

Figure 9:
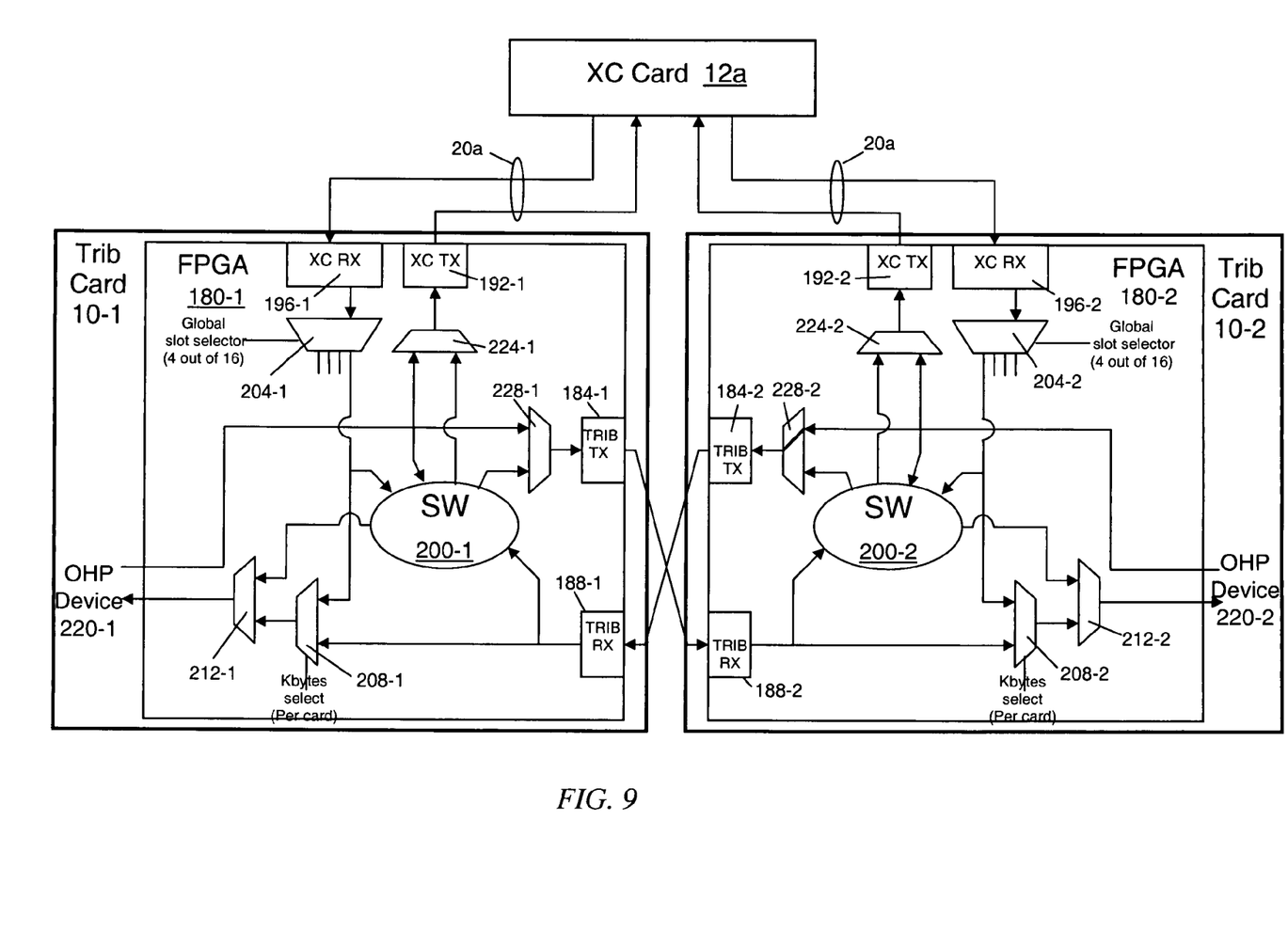
FIG. 9 is a block diagram of an embodiment of a representative pair of adjacent tributary cards, each tributary card having a programmable logic device that implements K-byte forwarding directly to adjacent tributary cards and indirectly to all other tributary cards in the network element through broadcasting of the K-bytes by the cross-connect card.

FIG. 9 shows a pair of adjacent tributary cards 10-1, 10-2 in communication with the XC card 12a over the trib-xc links 20a and with each other over the trib-trib link 22. The shelf 2 provides K-byte forwarding over the links 20a and 22 in accordance with the invention. The Trib cards 10-1, 10-2 are used here as a representative example of a pair of adjacent Trib. The redundant XC card 12b is also in communication with the Trib cards 10-1, 10-2 over trib-xc links 20b, but is not shown in FIG. 9 to simplify the description.

Each Trib card 10-1, 10-2 includes a programmable logic device (e.g., a field programmable gate array or FPGA) 180-1, 180-2, respectively. Each logic device 180 has a Trib transmitter 184 and a Trib receiver 188, an XC transmitter 192 and an XC receiver 196, and software registers 200. The trib-trib link 22 comprises two distinct physical connections: one connection passes from the Trib transmitter 184-1 of the Trib card 10-1 to the Trib receiver 188-2 of the Trib card 10-2, and the other connection passes from the Trib transmitter 184-2 of the Trib card 10-2 to the Trib receiver 188-1 of the Trib card 10-1. Each link 20a includes an electrically separate trib-xc link between the respective XC transmitter 192 of the Trib cards 10-1, 10-2 and the XC card 12a and an electrically separate xc-trib link between each XC receiver 196 of the Trib cards 10-1, 10-2 and the XC card 12a.

The XC receiver 196 has an input terminal connected to the xc-trib link 20a and an output terminal connected to an input terminal of a slot selector 204 of the logic device 180. The slot selector 204 has another input terminal for receiving a signal that which information received from the XC card 12a to process. In one embodiment, the slot selector 204 selects four of sixteen possible sources (i.e., cards) of information. Selected slots correspond to card positions in the shelf 2. The particular selection of four sources is changeable. Of the four sources selected, the slot selector 204 also selects one as the default source. Of the other three slots that are selected, software has read access to the status and K-Byte information received from those slots. Information arriving at the Trib card from this default source is automatically passed through the slot selector 204 for processing. This default source is also changeable. For example, the slot selector 204 can be programmed through this input terminal to select information from cards in slot 2, 4, 6 and 8 of the shelf 2, and of these four slots, to select information from the card in slot 4 by default. Although described in the context of K-byte forwarding, the operation of the slot selector 204 applies also to the selection of other status and protection information arriving at the Trib card from the XC card 12a.

An output terminal of the slot selector 204 is connected to one of three input terminals of a K-byte selector 208 of the programmable logic device 180 and to the software registers 200. A second input terminal of the K-byte selector 208 is electrically connected to an output terminal of the Trib receiver 188. (The output terminal of the Trib receiver 188 is also connected to the software registers 200.) The third input terminal of the K-byte selector 208, under software control, selects between K-bytes arriving at the first input terminal from the XC card 12a and those K-bytes arriving at the second input terminal from the adjacent Trib card.

An output terminal of the K-byte selector 208 is connected to an input terminal of a software override selector 212 of the logic device 180. A second input terminal of the software override selector 212 is connected to the software registers 200 and a third input terminal is connected to software for choosing between the other two input terminals. An output terminal of the software override selector 212 is connected to an overhead processor (OHP) device 220.

The XC transmitter 192 has an input terminal connected to an output terminal of a second software override selector 224 of the logic device 180. The second software override selector 224 has a first input terminal that is connected to the OHP device 220 for receiving K-bytes thereon, a second input terminal connected to the software registers 200, and a third input terminal connected to software for selecting between the other two input terminals. K-bytes obtained from the OHP 220 also pass to an input terminal of a third software override selector 228. A second input terminal of the third software override selector 228 is connected to the software registers 200, and a third input terminal selects between the K-bytes arriving on the first input terminal and information arriving from the software registers 200 on the second input terminal. An output terminal of the third software override selector 228 is connected to an input terminal of the Trib transmitter 184. Software can access the software registers 200 to view K-bytes received from the OHP device 220, K-bytes received through the Trib receiver 188-1, and software-specified K-byte values.

Figure 10:
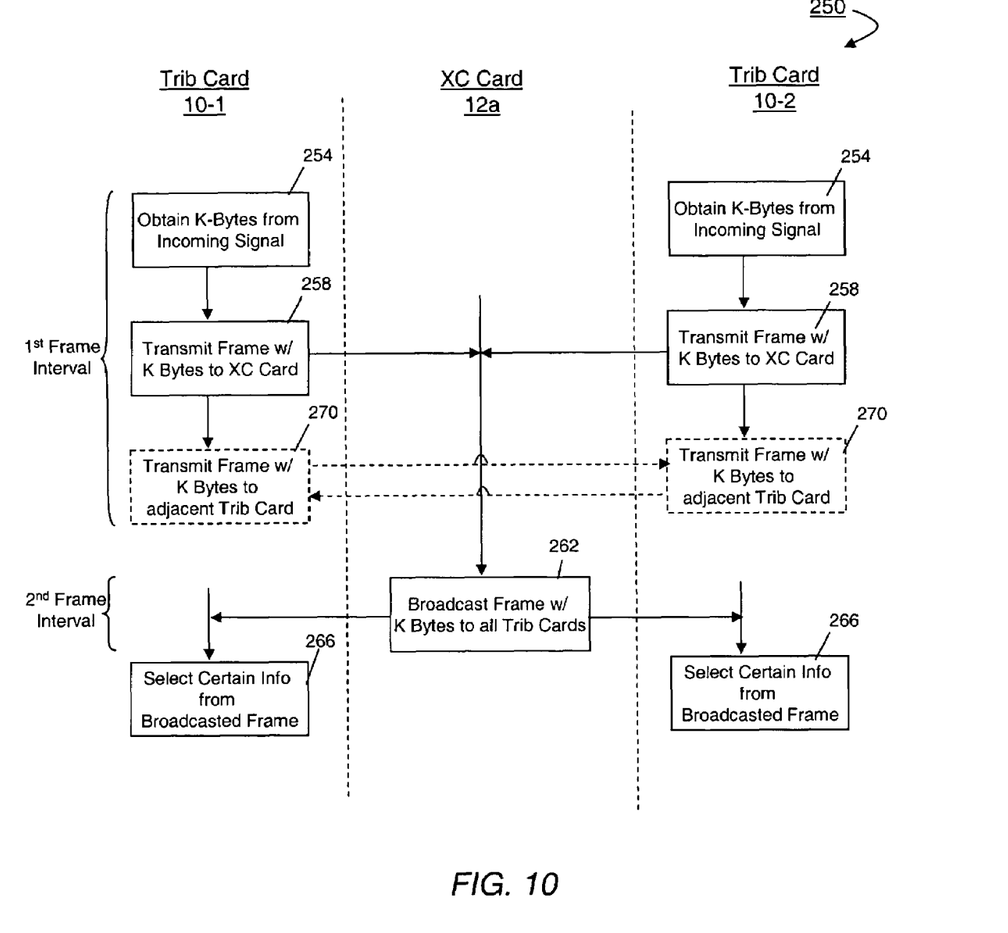
FIG. 10 is a flow diagram of an embodiment of a process for forwarding K-bytes to an adjacent tributary card and having the K-bytes broadcast to every tributary card in the network element.

FIG. 10 shows an embodiment of a process 250 for forwarding K-byte information among the cards 10, 12 in the shelf 2. In the description of the process 250, reference is made to the Trib card 10-1 and 10-2 of FIG. 9 as a representative example of adjacent tributary cards. Discussion of the redundant XC card 12b is excluded to simplify the description. Also, a frame interval means the amount of time required to transmit a frame, which in one embodiment is 125 us. The start of the frame interval may, but does not necessarily coincide with the transmission of the first bit of the frame containing the K-byte information.

At step 254, the OHP device 220-1 obtains the K-bytes (i.e., bytes K1 and K2) from incoming SONET signals and passes the K-bytes to the FPGA 180-1. The Trib card 10-1 obtains as many sets of K-bytes as the number of ports in the Trib card. The FPGA 180-1 validates the K-bytes before they are sent to the XC card 12a. During a first frame interval, the K-bytes pass to the second and third software override selectors 224-1, 228-1 of the Trib card 10-1. Provided there is no software override in operation, the second software override selector 224 forwards the K-bytes to the XC transmitter 192 for transmission (step 258) to the XC card 12a over the trib-xc link 20a. The Trib card 10-2 also forwards its K-bytes (step 258) received from its OHP 220-2 to the XC card 12a in like manner. As described above, in one embodiment the Trib card 10-1 transmits K-bytes to the XC card 12a during every other frame.

The XC card 12a collects the K-bytes from each of the Trib cards 10 received during the first frame interval and, during a subsequent frame interval, broadcasts (step 262) the K-bytes back to each Trib card 10 in the shelf 2, including the Trib card 10 (here, 10-1) sourcing the K-byte information. In one embodiment, the XC card 12a broadcasts the K-bytes to each Trib card 10a during every other frame.

The broadcast information arrives at the XC receivers 196-1, 196-2 of the Trib cards 10-1, 10-2, respectively. For example, K-bytes sent to the XC card 12a from the Trib card 10-1 (among others sent by the other Trib cards 10) are received by the Trib card 10-2, and those K-bytes forwarded by the Trib card 10-2 (among others forwarded by the other Trib cards 10) are received by the Trib card 10-1. Broadcasting the K-byte information enables Trib cards 10 that are not adjacent to each other in the shelf 2 to quickly exchange K-bytes with each other.

The XC receiver 192-2 of the Trib card 10-2 forwards the K-bytes to the slot selector 204-2. Assume, for purposes of illustration, software configures the slot selector 204-2 to automatically process K-bytes from the Trib card 10-1. Accordingly, the K-bytes sourced by Trib card 10-1 are selected (step 266) for forwarding to the K-byte source selector 208-2. If the K-byte source selector 208-2 is appropriately configured by software, the K-bytes received from the XC card 20a, instead of K-bytes received from the adjacent Trib card 10-1 over the trib-trib link 22, are forwarded to the first software override selector 212-2. When no software override is in effect, the first software override selector 212-2 forwards these K-bytes to the OHP device 220-2 for transmission over the optical facility. When software override is in effect, software-specified K-byte values stored in the software registers 200 are broadcast instead.

The software 112 can implement a software override by controlling the software override selector. The software 112 control whether the K-bytes coming from the OHP or software-specified K-bytes are forwarded.

An additional mechanism enables K-bytes to pass between adjacent Trib cards 10 connected by a trib-trib link 22. This mechanism can be supplemental to the passing of K-bytes through the XC card 12a, as described above. This mechanism can be a default setting that is deactivated when adjacent to a fiber failure or activated when the shelf 2 determines that it is a pass-through node for protection (i.e., not a node adjacent to the failure). Both the tributary and XC transmitters 184 and 192 can be active at the same time. While the XC transmitter 192-2 is transmitting a frame containing the K-bytes to the XC card 12a, the Trib transmitter 184-1 transmits (step 270) a frame to the adjacent Trib 10-2 over the trib-trib link 22.

With the K-byte forwarding mechanisms of the invention, the shelf 2 can be configured to support concurrently two different types of protection: BLSR protection and 1+1 protection. For tributary cards implementing BLSR protection, such tributary cards need not be adjacent to each other; for 1+1 line protection, tributary cards are typically adjacent. Tributary cards operating with BLSR protection use the XC card 12a to broadcast the K-bytes to the other tributary cards. Tributary cards supporting 1+1 protection can be adjacent to each other and use the trib-trib links 22 to forward K-bytes. Individual tributary cards can be involved in both types of protection.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of communicating protection-signaling information between cards in a network element, the method comprising:

receiving an incoming signal at a first card of a network element from over a network;

incorporating protection-signaling information obtained from the incoming signal into a first out-of-band signal;

transmitting the first out-of-band signal with the protection-signaling information incorporated therein from the first card to a second card in the network element over a link between the cards;

obtaining, by the second card, the protection-signaling information from the first out-of-band signal;

incorporating, by the second card, the protection-signaling information obtained from the first out-of-band signal into a second out-of-band signal; and simultaneously transmitting, from the second card to the first card and to one or more other cards in the network element, the second out-of-band signal having incorporated therein the protection-signaling information obtained from the first out-of-band signal.

2. The method of claim 1, wherein the first card is a tributary card and the second card is a cross-connect card.

3. The method of claim 1, further comprising receiving, by the first card, the second out-of-band signal having the protection-signaling information and determining which portion of the second out-of-band signal to process.

4. The method of claim 1, wherein the protection signaling information includes protection-switching protocol information.

5. The method of claim 4, wherein the incoming signal is an optical signal having a transport overhead, and the protection-switching protocol information is carried by K1 and K2 bytes of the transport overhead.

6. The method of claim 1, wherein each out-of-band signal is a frame transmitted at a frame rate used for synchronous data transmission of optical signals.

7. The method of claim 1, further comprising forwarding the protection-signaling information from the first card to a third card located physically adjacent to the first card in the network element over a second link different from the link used to carry the first out-of-band signal between the first and second cards.

8. The method of claim 7, wherein the first card and the third card are tributary cards.

9. The method of claim 1, further comprising:

receiving, by the second card, an out-of-band signal from each other card, each out-of-band signal received from each other card having protection-signaling information incorporated therein;

aggregating, by the second card, the protection-signaling information obtained from the out-of-band signals received from each other card; and incorporating the aggregated protection-signaling information into the second out-of-band signal together with the protection-signaling information obtained from the first out-of-band signal.

10. A method of communicating protection-signaling information between cards in a network element, the method comprising:

transmitting protection-signaling information from each of a plurality of tributary cards in the network element to a cross-connect card in the network element, each tributary card using an out-of-band signal to carry the protection-signaling information from that tributary card to the cross-connect card;

collecting, by the cross-connect card, the protection-signaling information carried by the out-of-band signals that are transmitted from the plurality of tributary cards to the cross-connect card;

incorporating the collected protection-signaling information into a new out-of-band signal; and simultaneously transmitting the new out-of-band signal with the collected protection-signaling information incorporated therein from the cross-connect card to each tributary card in the plurality of tributary cards in the network element.

11. The method of claim 10, wherein the protection-signaling information includes bytes K1 and K2 of a transport overhead of an optical signal.

12. The method of claim 10, further comprising forwarding protection-signaling information from a first one of the plurality of tributary cards to a second one of the plurality of tributary cards over a link dedicated to carrying out-of-band signals between the first and second tributary cards, the first one of the tributary cards being located physically adjacent the second one of the tributary cards in the network element.

13. A network element, comprising:

a backplane; and a plurality of cards connected to the backplane, the plurality of cards including a first card, a second card, and one or more other cards, the second card being in communication over the backplane with the first card and each other card of the plurality of cards, the first card receiving over a network an incoming signal having protection-signaling information and incorporating the protection-signaling information in a first out-of-band signal, the second card receiving the first out-of-band signal from the first card, obtaining the protection-signaling information from the first out-of-band signal, generating a second out-of-band signal with the protection-signaling information incorporated therein, and simultaneously transmitting the second out-of-band signal having the protection-signaling information to the first card and to each other card of the plurality of cards in the network element.

14. The network element of claim 13, wherein the first card is a tributary card and the second card is a cross-connect card.

15. The network element of claim 13, wherein the plurality of cards includes a third card in communication with the first card by a first link and with the second card by a second link, the third card receiving the protection-signaling information in an out-of-band signal from the first card over the first link and in an out-of-band signal from the second card over the second link.

16. The network element of claim 15, wherein the first and third cards are tributary cards.

17. The network element of claim 13, wherein each out-of-band signal is a frame transmitted at a frame rate used for synchronous data transmission of optical signals.

18. The method of claim 13, wherein the protection-signaling information includes bytes K1 and K2 of a transport overhead of an optical signal.

19. The network element of claim 13, wherein the second card receives an out-of-band signal from each other card, each out-of-band signal received from each other card having protection-signaling information incorporated therein, the second card aggregating the protection-signaling information obtained from the out-of-band signals received from each other card and incorporating the aggregated protection-signaling information into the second out-of-band signal together with the protection-signaling information obtained from the first out-of-band signal.

* * * * *